E. ELLIS.
COMBINED SEED PLANTER AND FERTILIZER DISTRIBUTER.
APPLICATION FILED JUNE 11, 1913.
1,093,321.
Patented Apr. 14, 1914.
3 SHEETS—SHEET 1.
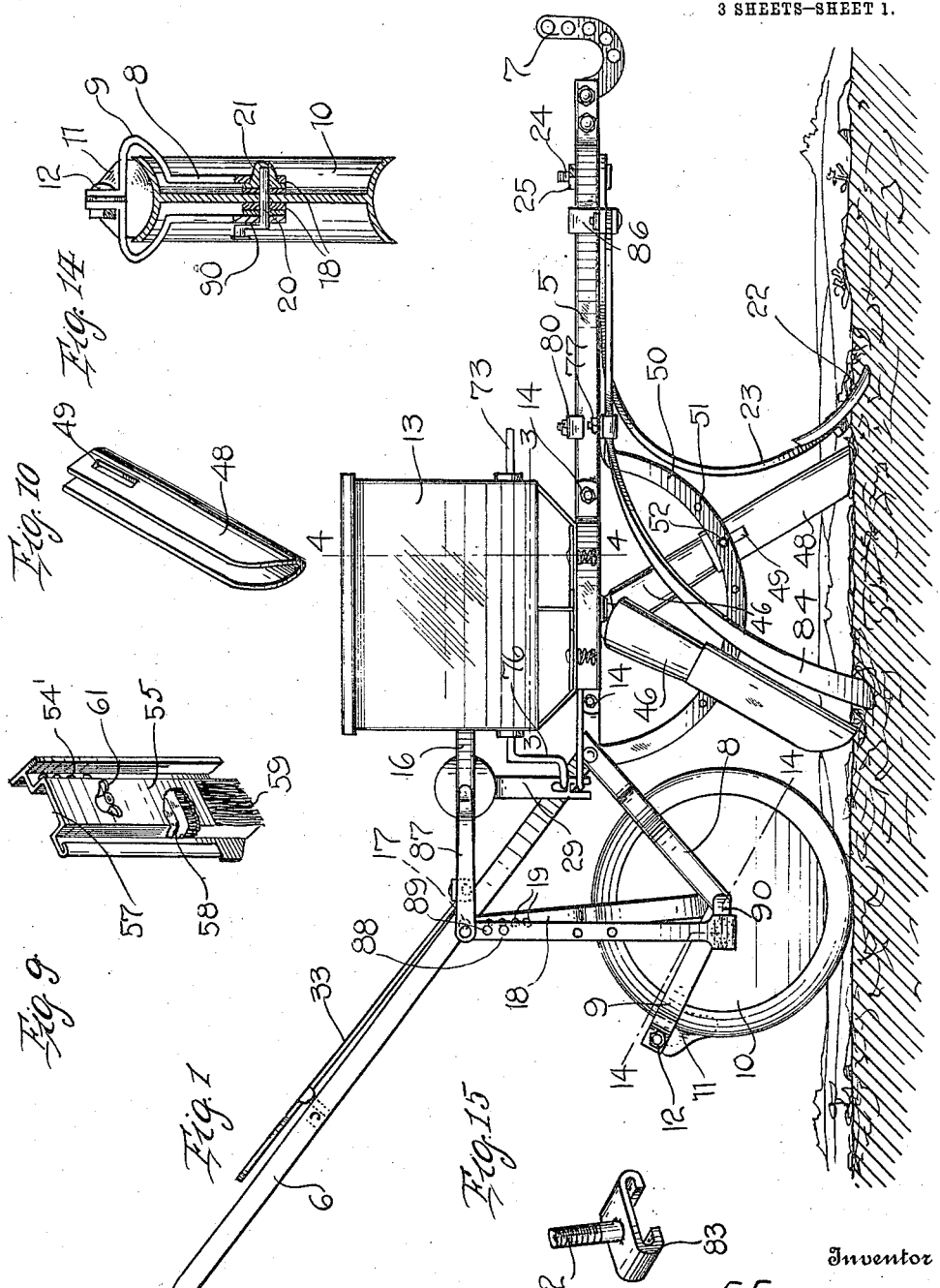
Witnesses
Robert M. Sutphen.
A. L. Hind.
Inventor
E. Ellis
By Watson E. Coleman
Attorney

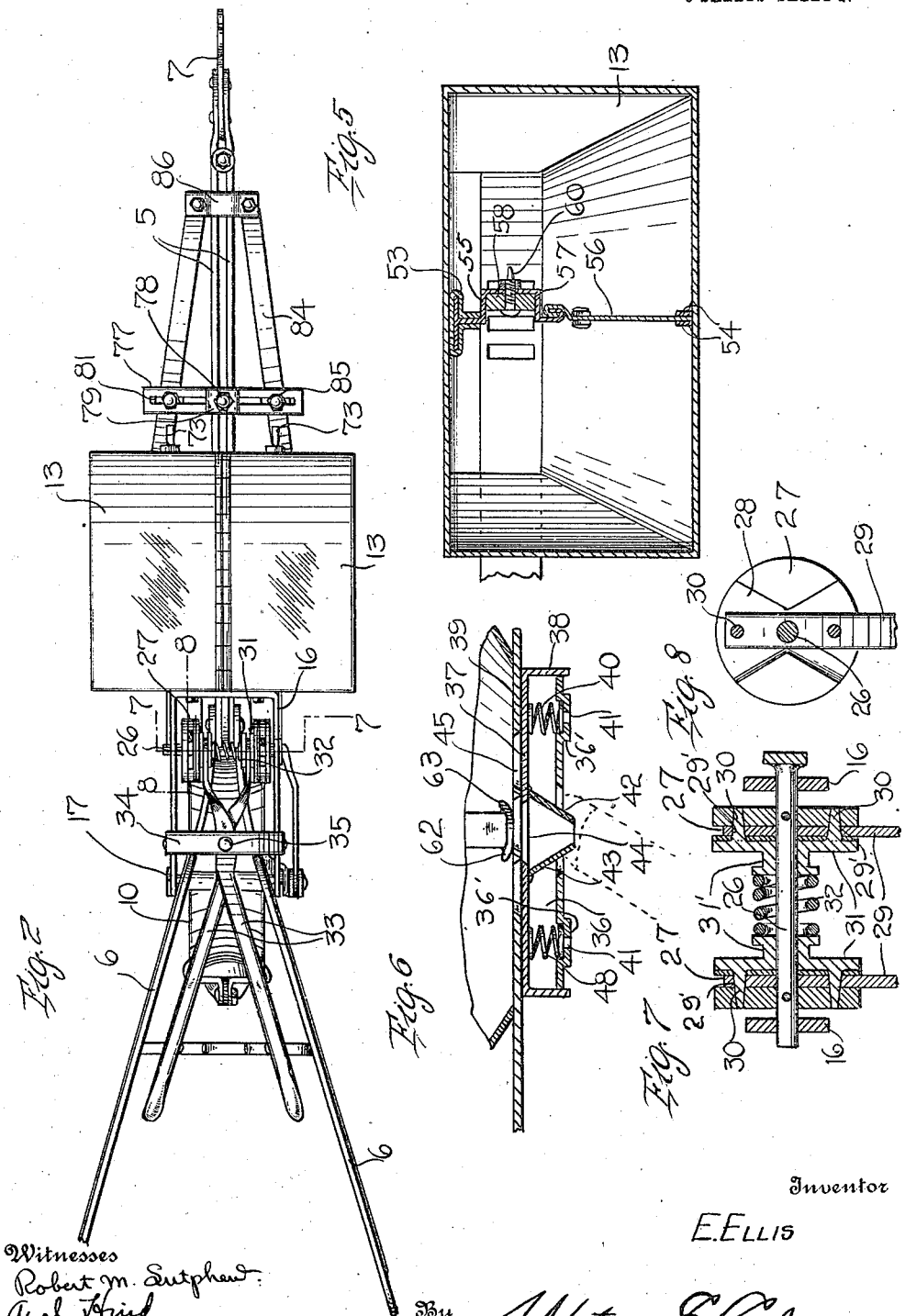

E. ELLIS.
COMBINED SEED PLANTER AND FERTILIZER DISTRIBUTER.
APPLICATION FILED JUNE 11, 1913.
1,093,321.
Patented Apr. 14, 1914.
3 SHEETS—SHEET 3.
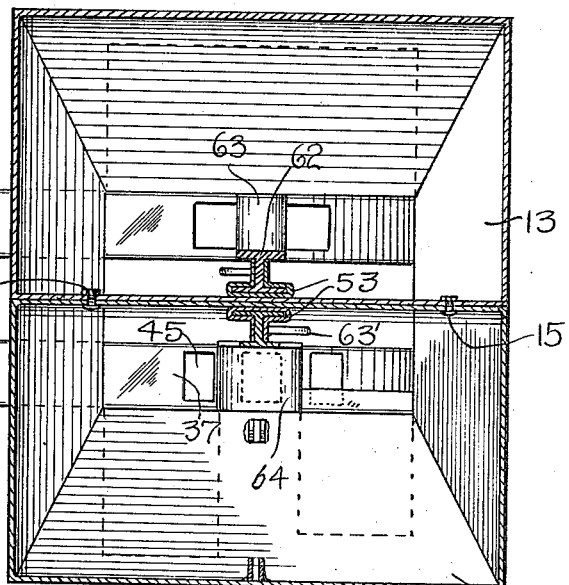
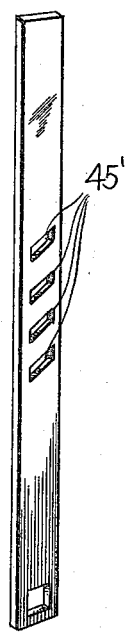
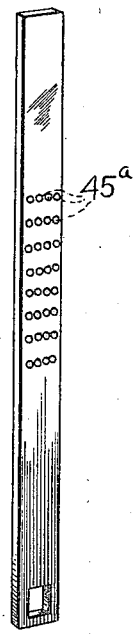
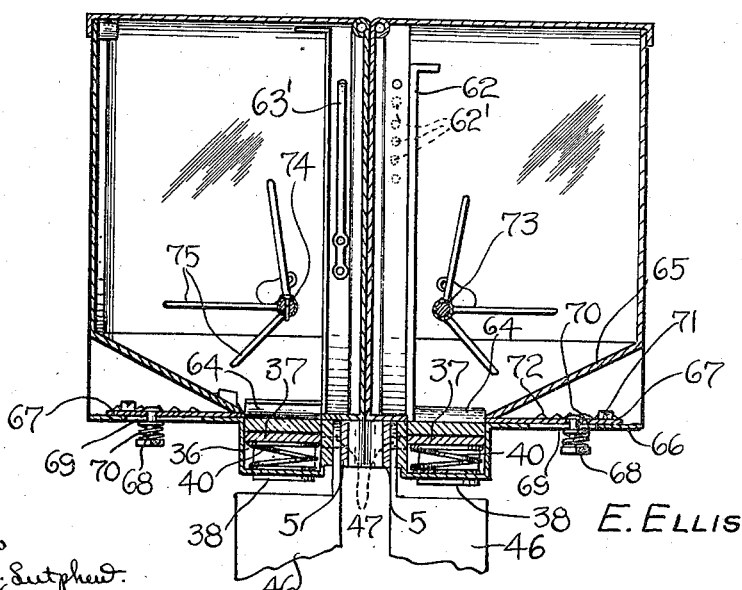
Witnesses
Robert M. Sutphen
A. I. Hind
Inventor
E. Ellis
By Watson E. Coleman
Attorney

UNITED STATES PATENT OFFICE.

EDGAR ELLIS, OF SULPHUR SPRINGS, ALABAMA.

COMBINED SEED-PLANTER AND FERTILIZER-DISTRIBUTER.

1,093,321.           Specification of Letters Patent.      Patented Apr. 14, 1914.

Application filed June 11, 1913. Serial No. 773,124.

*To all whom it may concern:*

Be it known that I, EDGAR ELLIS, a citizen of the United States, residing at Sulphur Springs, in the county of Dekalb and State of Alabama, have invented certain new and useful Improvements in Combined Seed - Planters and Fertilizer - Distributers, of which the following is a specification, reference being had to the accompanying drawings.

This invention relates to a combined seed planter and fertilizer distributer, and has for its primary object to provide improved means for automatically making a furrow, depositing a bed of fertilizer in the furrow and covering the same with a layer of earth in the movement of the machine, then depositing the seed upon the earth layer and finally covering the seed with a layer of earth.

The invention has for another object, the provision of an improved hopper construction whereby the same may be divided into separate compartments, and a slide plate mounted in the bottom of the hopper common to both compartments, said plate having openings through which the seed are dropped into the depositing boot.

It is a further object of the invention to generally improve and simplify the construction of machines of the above character, to increase their utility and serviceability in actual use, and to produce a highly durable and efficient machine which may be manufactured at comparatively small cost.

With the above and other objects in view, as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 1 is a side elevation of a combined seed planter and fertilizer distributer embodying the present invention in its preferred form. Fig. 2 is a top plan view thereof. Fig. 3 is a horizontal section taken on the line 3—3 of Fig. 1. Fig. 4 is a section taken on the line 4—4 of Fig. 1. Fig. 5 is a horizontal section through the seed hopper on the line 5—5 of Fig. 1, showing the partition plate arranged therein to divide the same into two different seed compartments. Fig. 6 is a detail longitudinal section on the line 6—6 of Fig. 4 through the seed hopper, showing the mounting and sliding valve plate. Fig. 7 is a section taken on the line 7—7 of Fig. 2. Fig. 8 is a section taken on the line 8—8 of Fig. 2. Fig. 9 is a detail perspective view partly in section of one of the feed regulating members. Fig. 10 is a detail perspective view of the adjustable section of the seed depositing boot. Figs. 11 and 12 are perspective views of sliding valve plates for use in planting seeds of different varieties. Fig. 13 is a detail perspective view of the cut-off plate. Fig. 14 is a detail section on the line 14—14 of Fig. 1. Fig. 15 is a detail perspective view of one of the adjustable guide members for the covering plates.

Referring in detail to the drawings, 5 designates a pair of parallel longitudinal bars which constitute the frame of the machine. These bars at one of their ends are upwardly and obliquely inclined to form diverging handles 6. Between the other or forward ends of the bars 5, a suitable clevis 7 for attachment of the draft devices is secured. A pair of downwardly and rearwardly extending wheel supporting bars 8 are secured at one of their ends to the parallel frame bars 5. These bars, adjacent their forward ends, are bent or curved, as shown, to accommodate the covering wheel 10. The rear ends of the bars 8 embrace the wheel rim, as shown at 9, (see Figs. 1 and 14) and between the same the scraping blade 11 is adjustably secured by means of the bolt 12, for engagement with the periphery of the covering wheel.

A pair of hoppers 13 are removably secured to the respective frame bars 5, by means of the bolts 14 extending through and connecting said bars. The opposed walls of these hoppers are further provided with coinciding openings to receive the connecting bolts 15. The hoppers 13 are further connected by a rearwardly extending, horizontally disposed, substantially U-shaped bar 16, the rear ends of said bar being connected by a transverse bolt 17. A pair of bars 18 are each provided with a series of openings 19 to receive the ends of the transverse bolt 17. The axle 20 of the covering wheel 10 is mounted to rotate in the lower ends of these bars. One of the bars 18 has formed upon its lower end a conical hub or projection 21 in which one end of the wheel axle 20 is journaled. One of the bars 8 has its intermediate portion engaged over this conical hub, while the other of said wheel carrying bars is provided with an opening to receive the wheel axle. It will be apparent that by mounting the wheel in this manner, the bolt connecting the upper ends of the bars 8 of the frame of the machine may be loosened and the upper ends of the depending bars 18 adjusted upon the ends of the U-shaped bar 16, thereby raising or lowering the wheel and determining the depth of the furrow. The furrow is formed by the plow or shovel 22 mounted upon the lower end of the curved bar 23. The upper end of this bar is adjustably clamped upon the frame of the machine by means of the bolt 24, said bolt being longitudinally movable between the frame bars 5 and held in its adjusted position by means of the nut 25.

A transversely disposed shaft 26 is mounted in the parallel portions of the U-shaped bar 16, adjacent to the hoppers 13. Upon opposite sides of the center of this shaft, the disks 27 are fixed. Each of these disks consists of two circular plates suitably connected together (see Figs. 7 and 8). The face of one plate is provided with a recess 28, which gradually widens or flares from the center of the plate to its periphery. The upper end of an arm 29 extends between the circular plates of each disk and is engaged in the recess 28, said arm being loosely mounted upon the shaft 26. This arm is provided with additional openings 29' upon the opposite sides of the shaft 26 to coincide with the openings in the disk 27. These coinciding openings are adapted to receive the diametrically opposed lugs or pins 30 projecting from one face of a clutch member 31 which is keyed upon the shaft 26. A coil spring 32 is arranged upon said shaft between the clutch members and normally acts to hold the same in locking engagement with the disks 27. These clutch members are adapted to be actuated by means of a pair of levers 33, which are crossed and are pivotally mounted at their point of intersection upon a bar 34 connecting the parallel portions of the bar 16, as shown at 35. The forward ends of these levers are engaged in grooves 31' provided in the clutch members. It will, therefore, be obvious, from reference to Fig. 2 of the drawings, that by pressing the rear ends of the levers toward each other, the clutch members will be moved inwardly against the action of the spring 32 and are disengaged from the openings in the arms 29.

Each of the hoppers 13 is provided in its bottom wall with a longitudinally extending channel 36. The ends of this channel are closed by the downwardly extending ends 38 of the plate 37, which is arranged in parallel relation to the bottom wall of said channel. This plate is yieldingly held against the bottom plate and a sliding valve plate 39 by means of a pair of springs 40, the lower ends of which are seated in the depressions 36' formed in the bottom wall of the channel 36. These depressions are provided with openings 41, through which dirt accumulating in the channel may escape. The bottom wall of the channel is centrally provided with an opening 42, to receive the lower end of a depending directing spout 43, which is suitably secured to the underside of the plate 37. This plate is provided with an opening 44, with which the openings 45 in the sliding valve plate 39 are adapted to register. The sliding valve plates 39 are connected, respectively, at their rear ends to the lower ends of the depending arms 29, and by said arms are longitudinally reciprocated in the respective hoppers.

46 designates the upper sections of a pair of depositing boots. These boot sections are pivotally mounted at their upper ends upon the respective seed boxes 13, as shown at 47, for swinging movement longitudinally of the machine. Upon each of the boot sections 46, the longitudinally extensible section 48 is arranged. Each of these adjustable boot sections is of channel form in cross section, and is provided in one of its walls with a longitudinal slot 49. A substantially semi-circular bar 50 is fixed at its ends to the frame bars 5, and is provided with a series of openings 51 to receive the bolts 52 which are arranged in the slots 49 of the adjustable boot sections 48. Suitable clamping nuts are threaded upon these bolts whereby the depositing boots may be securely fixed in their adjusted positions upon the curved bars 50. It will be apparent that by means of this sectional construction of the boots, the same may be adjusted in accordance with the depth of the furrow which is formed by the plow or shovel 22.

To the inner opposed walls of the hoppers 13, the vertically disposed guide members 53 are secured, and to the other or outer wall of one of the hoppers opposite the guide member 53, the parallel vertical guide flanges 54 are secured. This latter hopper is adapted to contain the seed to be planted, and in order to regulate the amount of seed passing through the openings in the sliding valve plate 39, a removable member 55 is adapted to be arranged in the hopper. One of the longitudinal edges of this member is preferably formed for engagement in the guide member 53 secured to the hopper wall, and the other end thereof is provided with a tongue and groove for engagement by a complemental tongue and groove formed upon one edge of a partition wall 56, the other edge of said partition wall being adapted for engagement between the spaced flanges 54. This plate is employed when it is desired to simultaneously plant two varieties of seeds and provides separate compartments in the hopper to contain the seeds. The member 55 is provided with a channel 57 to receive an adjustable bar 58 upon the lower end of which a brush 59 is secured. The bar 58 is slotted to receive a bolt 60 mounted in the member 55, a suitable clamping nut 61 being threaded upon said bolt, whereby the bar 58 may be secured in its adjusted position. It will be obvious that the proximity of the brush 59 to the upper surface of the sliding valve plate determines the quantity of seed which passes through each of the openings of said plate into the planting boot. In the other of the hoppers 13, which is adapted to contain the fertilizer, a feed regulating member 62 is removably and adjustably mounted in the vertical guide-way 53. Upon the lower end of this member a laterally extending curved foot plate 63 is formed which is disposed over the sliding valve plate 39 arranged in the bottom of the hopper. The concave face of the foot plate 63 is opposed to the opening in the sliding valve plate, and it will be obvious that by simply adjusting the member 62 vertically, the amount of fertilizer carried beneath the foot plate 63 in the sliding movement of the valve and deposited in the planting boot, may be varied. The members 55 and 62 are each provided with a series of openings 54' and 62', respectively, to receive the resilient locking or holding rods 63', said rods being fixed at their lower ends to the hopper walls and having their upper ends angularly bent for engagement in the openings provided in the vertically adjustable members and coinciding opening in the guide-ways 53.

In the planting of cotton, the foot plate on the lower end of the member 54, which is adapted to be arranged in the seed hopper in place of the feed regulating member 55, is curved, as shown at 64, in Fig. 6, and has its convex face opposed to the upper surface of the sliding valve member 39. The valve plate used for the planting of cotton seed, is provided with rectangular openings, the edges of which are beveled or inclined so that in the sliding movement of the plate, such lint as may be contained upon the seed will be cut off by the sharp edges of the openings in the valve plate as the seed is drawn against the convex face of the foot 63. The springs 40 will yieldingly hold the valve plate against the foot, and by cutting off the lint, as above stated, liability of the seeds hanging and failing to drop into the planting boot is obviated. In Figs. 11 and 12 of the drawings, I have shown two different forms of the sliding valve plate, in one of which a series of obliquely inclined rectangular openings 45' are provided, whereby a practically continuous feed of seed to the planting boot is obtained. In Fig. 12, the valve plate is provided with a series of small openings 45$^a$ for intermittently depositing the seed. This form of plate is used when planting clover or other relatively fine seed.

The bottom wall of each of the hoppers 13 is transversely inclined to the longitudinal channels 36, as shown at 65, and one of the side walls of the channel is extended beneath the inclined bottom of the hopper, as shown at 66. Upon the horizontal wall 66, the cut-off plates 67 are mounted, each of said plates being provided with a depending bolt 68 extending through a slot 69 provided in the wall 66. Upon these bolts and bearing against the underside of the walls 66, the springs 70 are arranged. A lug 71 is formed upon one edge of each of the plates 67 and engages a series of teeth 72, provided upon the upper surface of the wall 66. The plates 67 are adapted for movement inwardly beneath the inclined upper wall 65 and over the sliding valve plates, so that said plates 67 will cover a portion or all of the openings in the valve plate. In order to adjust the plates, the bolts 68 are forced upwardly to disengage the lugs 71 on the cut-off plates from the teeth 72.

In the bottom portion of each of the hoppers, a longitudinally extending shaft 73 is removably mounted, said shaft being journaled in the end walls of the hopper. A sleeve 74 is adapted to be engaged upon each of these shafts, said sleeve being provided with a plurality of agitating fingers or tines 75. One of the tines is adapted for detachable engagement in coinciding openings, provided in the sleeve and the shaft 73. The rear ends of the shafts 73 extend exteriorly of the hopper and each of them is provided with a crank 76, which is connected to one of the depending arms 29 adjacent its lower end, as shown in Fig. 1. When the seed hopper contains two different kinds of seeds, the agitator therein is removed, but when planting cotton seed, the agitator is arranged within the hopper so as to continually agitate the seed in the operation of the machine, and thereby insure its proper feed to the planting boot.

A transverse plate 77 is disposed beneath the frame bars 5 forwardly of the hoppers 13 and is adjustably secured upon the frame bars by means of the bolt 78 which extends between said bars and through the clamping plate 79 arranged upon the upper edges of the bars. A nut 80 is threaded upon the upper end of said bolt to clamp the plates 77 and 79 upon the bars 5. The plate 77 is provided upon each side of the frame bars 5 with a longitudinal slot 81, to receive the bolts 82. The lower ends of these bolts are provided with the guide plates 83 in which the longitudinally extending covering bars 84 are mounted. The bolts 82 are clamped in their adjusted positions in the plate 77 by means of the nuts 85. The rear ends of the covering bars 84 are downwardly curved and extend below the depositing or planting boots and are located at the opposite sides thereof. The forward ends of the bars 84 are pivotally mounted upon the ends of a sliding yoke 86, mounted upon the frame bars 5. It will be obvious that by simply shifting the bolts 82 in the slots of the plate 77 the covering bars may be disposed close together at their rear ends or spread apart, as may be required for the proper planting of the seed.

One end of the transverse shaft 26 is provided with a crank arm 87, to the end of which the upper end of a pitman 88 is adjustably connected, said pitman having a plurality of openings 89 therein to receive a bolt carried by the arm 87. The lower end of this pitman is connected to a crank 90 formed upon one end of the wheel axle 20. It will thus be understood that in the movement of the machine, as the covering wheel 10 revolves, the transverse shaft 26 is rocked and the sliding valve plates in the hoppers and the agitators are longitudinally reciprocated. It is to be understood that two of the sliding cut-off plates 67 (see Fig. 13) are provided, one for each compartment of the seed hopper when two different kinds of seed are being planted. Thus, by properly adjusting either one of these cut-off plates, the proportions of the two different varieties of seed to be deposited in the same hill, may be varied, as desired.

From the foregoing description taken in connection with the accompanying drawings, it is thought that the construction and manner of operation of the machine will be clearly and fully understood.

As shown in Fig. 1 of the drawings, the seed and fertilizer depositing boots, have been adjusted upon the bar 50 and the covering bars 84 disposed with relation thereto so that, the fertilizer is first deposited in the furrow formed by the plow or shovel 22, and a layer of earth is spread over this fertilizer by the bars 84. The seeds are then deposited upon the top of this earth layer and finally the seeds are covered by the covering wheel 10, which directs the earth from opposite sides of the furrow inwardly over the seed. Either the supply of fertilizer or seed may be readily cut off by shifting the proper lever 33 to disengage the clutch from one of the disks 27. It will be understood, moreover, that by simply adjusting the said depositing boot upon the bar 50 so as to dispose the same in advance of the rear ends of the covering bars 84, the seed may be deposited directly upon the fertilizer and the hole covered with a layer of earth by the covering bars.

As above explained, the lower sections of the boots may be readily adjusted with reprovided upon the upper surface of the lation to the plow point or shovel 22 so as to insure the proper deposition of the fertilizer.

My invention as a whole is comparatively simple in its construction and highly efficient and durable in operation, and may be produced at small manufacturing cost. The machine admits of the planting of a large quantity of seed in a comparatively short time and with but little manual labor.

Having thus described my invention, what is claimed, is:

1. In a machine of the character described, fertilizer and seed hoppers, a depositing boot arranged beneath each of the hoppers, each of said boots including an upper pivotally mounted section and a lower extensible section, a curved bar secured to the frame of the machine, clamping bolts adjustable in said bar, the extensible boot sections being slotted to receive said bolts, whereby the same are held in their adjusted positions with relation to the upper boot sections and with relation to each other, and means for feeding fertilizer and seed from the respective hoppers to said boots in the movement of the machine.

2. In a machine of the character described, fertilizer and seed hoppers, depositing boots arranged beneath said hoppers, means for adjusting said boots with respect to each other to space their discharge ends, means for automatically feeding the fertilizer and seed to the respective boots in the movement of the machine, and covering blades laterally and longitudinally adjustable with respect to the boots.

3. In a machine of the character described, fertilizer and seed hoppers, depositing boots arranged beneath said hoppers and adjustable with relation to each other to space their lower discharge ends, a longitudinally adjustable furrow opening shovel arranged in advance of said boots, longitudinally and laterally adjustable covering blades disposed rearwardly of the shovel, and means for automatically feeding the fertilizer and seed to the boots in the movement of the machine.

4. In a machine of the character described, fertilizer and seed hoppers, depositing boots arranged beneath said hoppers, a feeding plate mounted in the bottom of each hopper for longitudinal reciprocating movement, a cover wheel, a rock shaft provided with a crank arm, a crank extending from one end of the wheel axle, a pitman connecting the crank of the axle to the crank arm of said shaft, disks fixed upon said shaft, arms loosely mounted on the disks and connected to the feeding plates, and independently operable means mounted upon said shaft and normally locking the arms to the disks whereby either of the arms may be released from connection with the disk to discontinue the operation of the feeding plates.

5. In a machine of the character described, fertilizer and seed hoppers, depositing boots arranged beneath said hoppers, a feed plate mounted to reciprocate longitudinally in the bottom of each hopper, a transverse shaft, arms loosely mounted upon said shaft and connected to the respective feed plates, a crank on one end of said shaft, a covering wheel, the axle of said wheel being provided with a crank on one of its ends, a pitman connecting the crank of the axle to the crank arm of said shaft to actuate the latter, and means operable at the will of the operator to connect either of said arms to the shaft for movement thereby, whereby the feeding plates are reciprocated.

6. In a machine of the character described, fertilizer and seed hoppers, depositing boots arranged beneath said hoppers, a feed plate mounted to reciprocate longitudinally in the bottom of each hopper, a rock shaft provided with a crank on one end, a covering wheel, the axle of said wheel having a crank on one end, a pitman connecting said cranks whereby the rock shaft is actuated in the movement of the machine, disks fixed upon the rock shaft, arms loosely mounted upon said rock shaft and connected at their lower ends to the respective feed plates, the upper ends of said arms and said disks being provided with coinciding openings, a pair of clutch members keyed upon the shaft and each provided with pins for engagement in said openings, a spring arranged between the clutch members yieldingly holding the same in locking engagement with the disks and arms, and a pair of pivotally mounted levers for independently operating said clutch members to release either of the arms from connection with said disks at the will of the operator.

In testimony whereof I hereunto affix my signature in the presence of two witnesses.

EDGAR ELLIS.

Witnesses:
W. A. LAWRY,
R. H. KOGER.